United States Patent [19]

Klinedinst et al.

[11] Patent Number: 5,049,408
[45] Date of Patent: * Sep. 17, 1991

[54] METHOD FOR COATING PHOSPHOR PARTICLES USING ALUMINUM ISOPROPOXIDE PRECURSORS AND AN ISOTHERMAL FLUIDIZED BED

[75] Inventors: Keith A. Klinedinst, Marlborough; Richard A. Gary, Everett, both of Mass.

[73] Assignee: GTE Laboratories Incorporated, Waltham, Mass.

[ * ] Notice: The portion of the term of this patent subsequent to Mar. 12, 2008 has been disclaimed.

[21] Appl. No.: 573,091

[22] Filed: Aug. 24, 1990

Related U.S. Application Data

[63] Continuation-in-part of Ser. No. 432,941, Nov. 7, 1989, Pat. No. 4,999,219.

[51] Int. Cl.$^5$ .......................... B05D 5/12; B05D 7/00
[52] U.S. Cl. ........................................ 427/69; 427/64; 427/126.4; 427/213; 427/67; 427/68; 427/255.3
[58] Field of Search ................ 427/69, 64, 126.4, 213, 427/67, 68, 255.3; 313/489, 486, 487

[56] References Cited

U.S. PATENT DOCUMENTS

| | | |
|---|---|---|
| 2,805,965 | 9/1957 | Robinson ............................ 117/221 |
| 2,972,555 | 2/1961 | Deutscher .......................... 117/106 |
| 3,408,223 | 10/1968 | Shortes ............................... 427/214 |
| 3,705,055 | 12/1975 | Christensen et al. .............. 117/212 |
| 4,585,673 | 4/1986 | Sigai .................................... 427/213 |
| 4,710,674 | 12/1987 | Sigai .................................... 313/489 |
| 4,740,643 | 4/1988 | Lenczyk ............................. 570/243 |
| 4,803,400 | 2/1989 | Peters et al. ....................... 313/489 |

OTHER PUBLICATIONS

Tajima Y. A., Marsel D. J., "Mechanism of Pyrolysis of Aluminum Alkyls", AIAA Heterogeneous Combustion Conference, Dec. 11-13, 1963, pp. 403-418.
Zenz, F. A., Othmer, D. F., "Fluidization and Fluid--Particle Systems", Reinhold Publ. Corp., pp. 3-4 (1960).
Cameron, D. C., Irving, L. D., Jones, G. R., Woodward J., Thin Solid Films, 91, pp. 339-347 (1982).
C. Dhanavantri, R. N. Karekar, Thin Solid Films 127, pp. 85-91 (1985).
J. Saraie, J. Kwon, Y. Yodogawa, J. Electrochem. Soc. 132, pp. 890-892 (1985).
H. Mutoh, Y. Mizokami, H. Matsui, S. Hagiwara, M. Ino, J. Electrochem. Soc. 122, pp. 987-992 (1975).
A. A. Barybin, V. I. Tomilin, Zhurnal Prikladnoi Khimii, vol. 49, No. 8, pp. 1699-1702 (1976).
M. T. Duffy, A. G. Pevesz, J. Electrochem. Soc. vol. 117, pp. 372-377 (1970).

*Primary Examiner*—Shrive Beck
*Assistant Examiner*—Roy V. King
*Attorney, Agent, or Firm*—Carl F. Ruoff

[57] ABSTRACT

Disclosed is a method for applying a continuous protective coating to the surface of individual phosphor particles. The method involves chemical vapor deposition of an aluminum oxide coating on individual particles of a phosphor powder while the particles are suspended in a fluidized bed. The particles in the fluidized bed are exposed to vaporized coating precursor material, preferably aluminum isopropoxide at a temperature above 300° C. The bed is kept at as nearly an isothermal condition as possible. Prior to entering the fluidized bed the aluminum isopropoxide is vaporized and kept at a temperature less than the decomposition temperature of aluminum isopropoxide. Mechanical means are used to help increase the fluidization efficiency of the fluidized bed. After coating the phosphor particles for approximately 30 minutes the vaporized precursor material is shut off from the bed entrance and the oxygen flow rate to the fluidized bed is increased. This carbon reduction step lasts for approximately 15 minutes. The coating step and carbon reduction step can be repeated to increase the thickness of the aluminum oxide coating on the phosphor particles.

7 Claims, 9 Drawing Sheets

METHOD FOR COATING PHOSPHOR PARTICLES USING ALUMINUM ISOPROPOXIDE PRECURSORS AND AN ISOTHERMAL FLUIDIZED BED

CROSS REFERENCE TO RELATED APPLICATION

This application is a continuation-in-part of applicants' copending application Ser. No. 07/432,941 filed Nov. 7, 1989, now U.S. Pat. No. 4,999,219.

BACKGROUND OF THE INVENTION

This invention relates to a method for applying a continuous protective coating to the surfaces of individual phosphor particles. The method involves chemical vapor deposition of the protective coating on individual particles of a phosphor powder while the particles are suspended in a fluidized bed.

Sigai U.S. Pat. No. 4,585,673 ('673 patent) which is incorporated by reference herein, describes a relatively complex gas phase technique for the deposition of protective coatings on individual phosphor particles by chemical vapor deposition while the particles are suspended in a fluidized bed. The fluidized particles are exposed to a vaporized precursor material at a temperature that is below that at which a precursor material decomposes. After the particles have been enveloped by the precursor material at a first temperature, the absorbed precursor is reacted to form a continuous protective coating on the surfaces of the individual particles at a second higher temperature. In a preferred version of this technique, the volatizable coating precursor is vaporized into an inert carrier gas which is subsequently passed through a phosphor powder to form a coating precursor material. The fluidized bed is maintained in a temperature gradient ranging from a lowest temperature to a highest temperature, the lowest temperature being less than the decomposition temperature of the coating precursor material, and the highest temperature being at least sufficient to react the precursor with an oxidizing gas to form the desired coating. The oxidizing gas is passed into the fluidized bed separately from the vapor containing carrier gas.

In the examples cited by the '673 patent, the coating precursor is trimethylaluminum (TMA) and the oxidizing gas is molecular oxygen. However, the patent also contains claims concerning the use of oxygen containing coating precursor materials (see claims 10, 22, and 25). An example of such an oxygen containing precursor is aluminum isopropoxide (AIP). AIP has frequently been used to form alumina coatings on semiconductor substrates via chemical vapor deposition as well as on metal, glass or ceramic substrates. In U.S. Pat. 3,408,223 a process in which phosphor particles are exposed to a gaseous medium including oxygen and aluminum oxide formed by heating a vaporized mixture of AIP and oxygen is disclosed. The oxide materials are condensed on the surfaces of the phosphor particles to form surface barrier layers suitable for modifying the electron beam energy threshold of the material. In the process, the particles are passed downwardly through the heated gaseous medium, preferably along a generally spiral path, recirculating repetitively through the gaseous medium.

There are several reasons why AIP might be preferred over TMA as a coating precursor. Perhaps the most compelling of these is the safety factor. AIP is a solid material at ambient temperatures and pressures rather than a volatile liquid such as TMA. Further, although AIP is flammable (as are the vast majority of organic and organometallic compounds), it is not pyrophoric. In contrast, TMA (along with other aluminum alkyls) bursts into flame upon coming into contact with air or moisture, producing smoke containing finely divided aluminum oxides and alkoxides. AIP owes its nonpyrophoricity mainly to its molecular structure which contains three oxygen atoms bonded to a central aluminum atom. Thus, the aluminum atom is already in an oxidized state. Besides making AIP almost infinitely safer to handle and use than TMA, the presence of the aluminum-oxygen bonds also provides a means to the formation of aluminum oxide, via thermal decomposition, without requiring a source of external oxygen. Finally, the cost of AIP is only about 2% of the cost of TMA, an obvious commercial advantage However, there are disadvantages associated with the use of AIP as a coating precursor in the process described in the '673 patent. One relatively minor disadvantage is the fact that the AIP bubbler through which the nitrogen carrier gas flows on its way to the entrance to the fluidized bed must be maintained at a temperature in the vicinity of 150° C. to achieve AIP vapor pressures and transport rates comparable to those obtained with TMA in a 30° C. temperature bubbler. This means that the line exiting the bubbler leading to the fluidized bed reactor, must be maintained at a temperature of approximately 150° C. to prevent condensation of the AIP vapors within the heated line.

The second and more serious disadvantage derives from the decomposition kinetics of AIP compared with those of TMA. Both TMA and AIP begin thermally decomposing at temperatures between 150° and 200° C. With TMA, the main products of decomposition are aluminum carbide and methane as shown below.

$$4Al(CH_3)_3 \rightarrow Al_4C_3 + 9CH_4 \qquad (1)$$

The aluminum carbide forms as a dense, dark colored deposit.

AIP, on the other hand, decomposes to form aluminum oxide, isopropanol, and propane as shown below.

$$2Al(i\text{-}OC_3H_7)_3 \rightarrow Al_2O_3 + 3C_3H_7OH + 3C_3H_6 \qquad (2)$$

The aluminum oxide forms as a voluminous white deposit. The thermal decomposition of AIP is an undesirable reaction and must be avoided if a controlled, predictable phosphor coating process is to be achieved.

If the thermal decomposition of TMA does occur to a limited event, products are formed, a dense solid and a low molecular weight gas, which do not interfere significantly with the phosphor coating reaction In contrast, if the thermal decomposition of AIP occurs, products are formed, a voluminous sticky solid and comparatively high molecular weight alcohols and olefins, which at the very least, increase the effective viscosity of the fluidized bed and which at worst can clog the pores of the gas distributor, essentially shutting down the fluidized bed reactor.

Moreover, a similar situation exists with respect to the coating reaction itself. With both TMA and AIP, complete oxidation of the coating precursor produces aluminum oxide, carbon dioxide, and water. However, the incomplete oxidation of the AIP precursor produces a mixture of partially oxidized methane, ethane, and propane derivatives, while the incomplete oxidation of TMA produces only a relatively small quantity of methane derivatives. Thus, at any point in the coating process, there is a much higher concentration of comparatively high molecular weight partially oxidized hydrocarbons in the fluidized phosphor bed with AIP as the coating precursor than there ever is with TMA as the precursor. Such hydrocarbon substances are absorbed upon the surfaces of the phosphor particles, leading to increased cohesive forces between these particles, thereby increasing the effective viscosity of the fluidized bed.

Another drawback to using AIP as a precursor is that residual carbon concentrations tend to be higher on the alumina coated phosphor particles than when using TMA as a precursor. Higher carbon concentrations in the conformal alumina coating reduce the phosphor brightness of the annealed particles. Increased carbon concentrations in the alumina coating also lead to increased phosphor body-color and reduced luminescent efficiency. The resulting phosphor is therefore not a commercially viable product for lamp production.

Thus, in order to employ AIP as a coating precursor in the fluidized bed reactor, the decomposition of the precursor must be prevented, at least until the precursor contacts the phosphor powder within the fluidized bed. In addition, the fluidized bed must be operated in a manner so as to counteract the tendency towards particle agglomeration that results from the presence within the bed of a relatively high concentration of organic byproducts and intermediates and results in high carbon concentrations in the alumina coatings on the phosphor particles.

However, these process design goals are largely in opposition to one another. On one hand, we seek to maximize fluidization efficiency so as to prevent the breakdown or clogging of the bed due to the buildup of organic byproducts and intermediates. On the other hand, the more efficiently the bed is fluidized, the more nearly isothermal it becomes. Moreover, due to the extremely efficient heat transfer between the fluidized particles and the walls of the container, the temperature of the surface of the gas distributor approaches that of the fluidized bed. Since the coating process operates most efficiently with bed temperatures above about 400° C., the more efficiently the bed fluidizes, the greater the chance of precursor thermal decomposition as it flows along with the carrier gas through the plenum which underlies and supports the gas distributor and on through the fine-pored distributor itself. Thus, in order to realize the substantial advantages of AIP over TMA as a coating precursor, techniques must be found to maintain efficient fluidization within the fluidized bed, despite the presence within the bed of organic materials which tend to increase particle agglomeration and stickiness, while at the same time ensuring that the AIP containing carrier gas does not contact a surface temperature in excess of about 180° C. prior to entering the fluidized bed. This must be accomplished despite the fact that the bed must be maintained at temperatures in excess of approximately 400° C. to achieve nearly complete oxidation of the organic byproducts of the coating reaction. The present invention effectively solves these problems and describes a method in which alumina coatings are applied to phosphor particles in a fluidized bed using AIP as a coating precursor.

SUMMARY OF THE INVENTION

An automated and continuous process has been developed for the formation of a conformal alumina coating on the surfaces of finely divided phosphor particles. Aluminum isopropoxide (AIP) is vaporized and carried into a fluidized bed reactor with an inert carrier gas. The entrance to the fluidized bed reactor is maintained at a temperature between 150° C. and 180° C. The AIP containing vapor is carried through a gas distributor. The gas distributor is also maintained at a temperature between 150° C. and 180° C. The AIP containing gas then travels through a layer of a porous non-woven material which is positioned over the top surface of the gas distributor. The porous non-woven glass material acts as an insulator to keep the gas distributor at a temperature below the decomposition temperature of AIP. Within the fluidized bed is luminescent or phosphor powder. The fluidized bed is maintained at a temperature of approximately 300°-500° C., preferably above 400° C. Once the fluidized powder bed has reached the desired coating reaction temperature, gaseous oxygen along with AIP containing carrier gas is transported into the fluidized bed. At this point, the coating process begins. The AIP is oxidized forming an aluminum oxide layer on the phosphor particles. In a preferred embodiment of this invention, the fluidized bed is agitated continuously during the process to ensure a high fluidization efficiency. In addition, the fluidization efficiency of the phosphor powder may be improved by blending the phosphor with up to 1 weight percent of a fluidizing aid such as Aluminum Oxide C.

In an alternative process of the present invention, there is a two step process, a coating step and a carbon reduction step. There is an alternation between steps. The coating step is basically identical to the process described in the preceding paragraph. In the carbon reduction step the oxidant is pumped into the heated fluidized powder bed in the absence of the reactive coating precursor, namely AIP. This results in a conformal alumina coating containing minimal amounts of carbon impurities as the carbon in the coated phosphor is burned away. The temperature of the fluidized bed during the carbon reduction step is between 300°-500° C. and usually runs higher than the coating step. The resulting phosphor has the proper color and maintenance properties for commercial applications.

It is therefore an object of the present invention to provide a method for coating phosphor particles using aluminum isopropoxide.

Another object of the present invention is to provide a method for coating phosphor particles with an alumina coating having a low carbon concentration.

Figure 1:
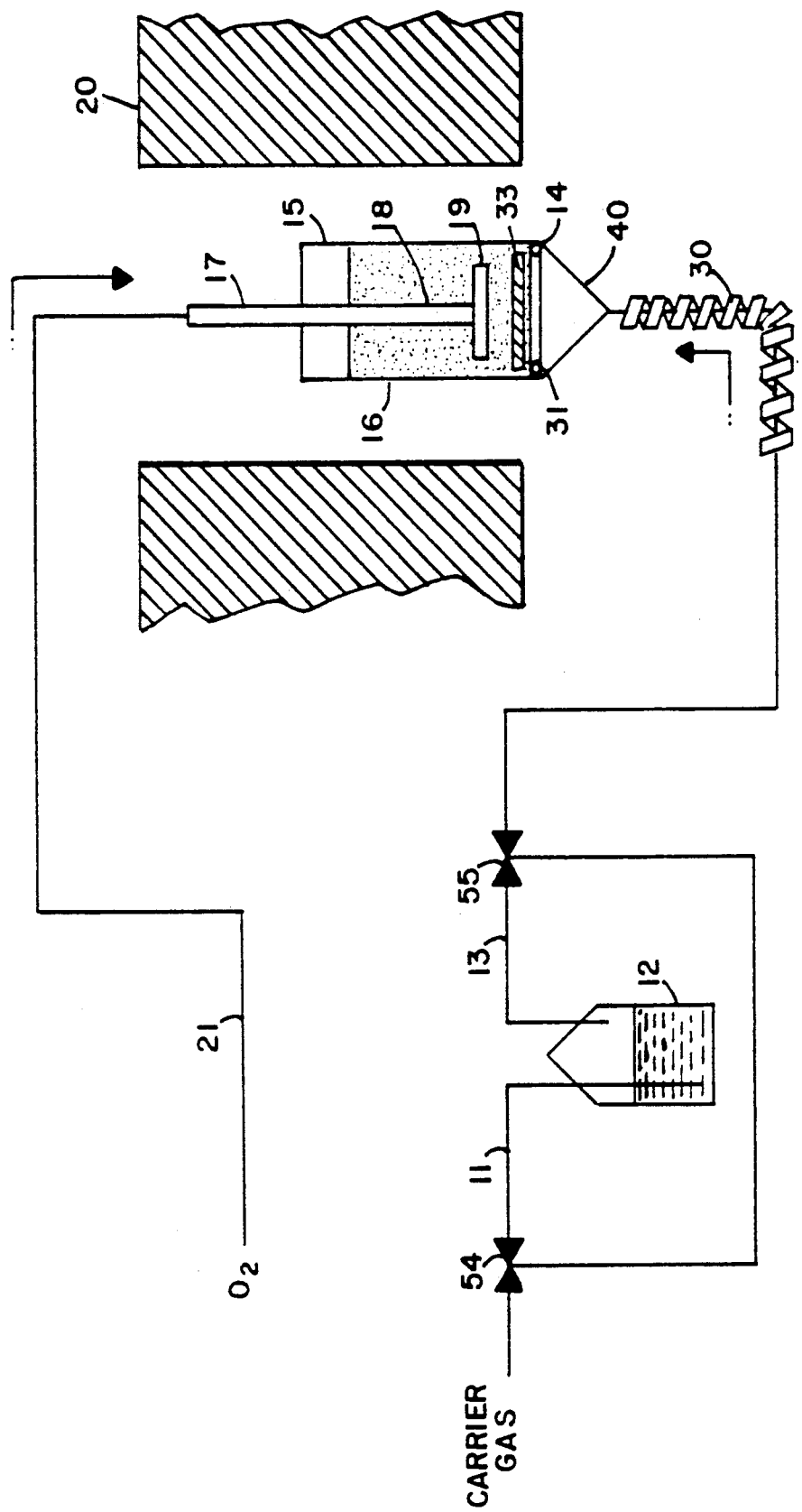
FIG. 1 is a schematic representation of an apparatus suitable for use in the method of the present invention.

For a better understanding of the present invention together with other and further objects, advantages and capabilities thereof, reference is made to the following disclosure and appended claims in connection with the above described drawing.

DETAILED DESCRIPTION OF THE PREFERRED EMBODIMENTS

The method of the present invention involves the formation of a continuous protective coating on phosphor particles by gas phase deposition while the phosphor particles are suspended within a fluidized bed. During the coating operation the fluidized bed is maintained at the highest possible fluidization efficiency. Prior to beginning the coating operation, the fluidized bed is heated with external heating elements. Once the fluidizing powder bed reaches the desired coating reaction temperature, oxygen is transported into the fluidized bed, and the inert fluidizing gas passes through and AIP filled bubbler maintained at approximately 150° before entering the fluidized powder bed through a porous gas distributor. The gas distributor is maintained at a temperature between the bubbler temperature and the temperature at which AIP thermal decomposition begins. It has been found that due to the presence within the bed of a relatively high concentration of partially oxidized hydrocarbons which absorb upon the surfaces of the phosphor particles, some sort of mechanical agitation is required near the bottom of the fluidized bed in order to counteract the tendency of the phosphor particles to stick together which leads to decreased fluidization efficiency. A rotating or vibrating device may be employed to prevent the phosphor particles from sticking together and increasing the fluidization efficiency.

Two steps may be taken to prevent AIP thermal decomposition prior to the point at which the AIP vapor contacts the heated powder in the fluidized bed. First, heat exchangers may be installed within the stainless steel plenum and within the porous stainless steel distributor. The heat exchange takes place between the plenum and a heat-exchange fluid flowing through a channel machined into the plenum wall, or between the porous stainless steel distributor and the same heat-exchange fluid flowing through a spirally coiled ¼ inch diameter stainless steel tube embedded within the distributor. A suitable heat-exchange fluid is Lauda Ultra-Therm 330 SCB, the temperature of which may be controlled using a Lauda USH12 high temperature controller.

Secondly, porous thermal insulation may be installed in the bottom of the fluidized bed, between the top surface of the gas distributor and the bottom of the fluidized powder bed. The thermal insulation consists of one or more sheets of woven or non-woven paper or cloth manufactured from glass or ceramic fiber materials, or of a sheet of hard ceramic material which has been perforated to allow passage of the fluidizing gas (inert carrier gas containing AIP vapors). A typical non-woven glass-fiber paper is Zircar Type ZYW15 zirconia cloth; and a typical machinable ceramic is Aremco Products 502 series machinable ceramic.

In order to reduce residual carbon concentration on the coatings of the phosphor particles, alternating coating and carbon reduction periods are employed so as to more thoroughly eliminate partially reacted hydrocarbon intermediates on the surface of the phosphor particles. The coating steps of the process were 30 minutes in duration and are carried out as described above. The carbon reduction steps are carried out as follows. The nitrogen fluidizing gas is diverted so that it bypasses the AIP bubbler. At the same time the oxygen gas flow rate is increased. The carbon reduction step lasts for 15 minutes. After the last carbon reduction step, the coated phosphor is annealed in air.

By the use of these techniques (embedded heat exchangers with a heat-exchange fluid and a high temperature fluid circulator, coupled with porous thermal insulation lining the bottom of the fluidized bed), all surfaces contacted by the AIP vapors prior to entering the fluidized bed may be maintained at a temperature ranging between the AIP bubbler temperature (the lower limit) and the temperature at which the rate of AIP decomposition becomes significant (the upper limit). The lower temperature limit is roughly 150° C., while the upper temperature limit is roughly 200° C. By use of the alternating coating and carbon reduction steps, alumina coatings are formed having lower carbon concentrations than those coatings formed using the one step process.

In order to avoid particle agglomeration and possible breakdown of the fluidized bed, steps can be taken to maintain the highest possible fluidization efficiency throughout the coating operation. Further, the more efficiently the bed is fluidized, the more nearly isothermal it becomes. Thus, the extent to which the fluidized bed deviates from an isothermal condition may be used as an indication of the fluidization efficiency. The '673 patent describes the use of a series of thermocouple probes located at various positions within a fluidized bed to monitor the quality of fluidization and the risk of an uncontrollable upset in the reactor. Similarly, in the method of the present invention, a vertical array of three thermocouples is used to monitor the temperatures at various points in the fluidized bed. Typically, the bead of one thermocouple is located at a point less than 1 cm above the porous gas distributor, another is located at about the midpoint of the fluidized bed, and a third is located near the top of the bed. The bed temperatures indicated by these three thermocouples are recorded as a function of time using a multichannel data logger. The more nearly identical the temperatures indicated by the three thermocouples during the coating operation, the more efficient is the fluidization of the phosphor powder bed. This gives an indication of the degree to which the powder has agglomerated or stuck together.

It should be noted that the method here disclosed differs from that described in the '673 patent in a number of respects, perhaps the most important of which centers around whether or not a temperature gradient is maintained within the fluidized bed. In the method of the '673 patent, "the fluidized bed is maintained in a temperature gradient ranging from a lowest temperature to a highest temperature, the lowest temperature being less than the decomposition temperature of the coating precursor material and the highest temperature being at least a temperature sufficient to react the precursor material with an oxidizing gas to form the desired coating material". In contrast, the method disclosed here seeks to eliminate any and all temperature gradients within the fluidized bed.

Another important distinction between the present invention and the process described by the '673 patent is that one aspect of the present invention includes a two step process. In the first step the phosphor particles are coated with the alumina precursor materials. In the second step the coating on the phosphor particles is further oxidized removing various hydrocarbons and reducing the carbon concentration in the coating.

It is found that, prior to the beginning-of the coating operation, while the fluidized bed is being heated to the coating process temperature via external heating elements, the fluidization efficiency of the phosphor powder may be improved by blending the phosphor with up to about 1 weight percent of a fluidizing aid such as Aluminum Oxide C. Once the fluidizing powder bed reaches the desired coating reaction temperature, gaseous oxygen is transported into the fluidized bed through holes circumferentially located around a hollow shaft positioned vertically within the center of the fluidized bed, and the nitrogen fluidizing gas is passed through an AIP-filled bubbler, maintained at about 150° C., before entering the fluidized powder bed via the porous gas distributor which is itself maintained at a temperature between the bubbler temperature and the temperature at which AIP thermal decomposition begins. Once the coating process begins, however, the effectiveness of the Aluminum Oxide C fluidizing aid is nullified as both it and the phosphor are coated with aluminum oxide formed by the high temperature oxidation of the AIP within the fluidized powder bed. It is the moisture produced within the high temperature fluidized bed as a byproduct of the AIP oxidation reaction that makes possible the continued fluidization of the phosphor powder bed once the coating reaction begins. However, it has been found that, due to the presence within the bed of a relatively high concentration of partially oxidized hydrocarbons which adsorb upon the surfaces of the phosphor particles, some sort of mechanical agitation is required near to the bottom of the fluidized bed in order to counteract the tendency of the phosphor particles to stick together. Either a rotating or a vibrating device may be employed for this purpose. As an example, vibrational energy may be generated via the use of a Vibromixer E1 available from Chemap AG, South Plainfield, N.J. The vibrational energy may be transmitted to the bottom of the bed via the hollow shaft through which the oxidizing gas is transported into the fluidized powder bed.

An important aspect of the method described here involves the use of a specially designed agitator element which attaches to the bottom of the vibrating shaft. A particularly useful agitator element is formed from a circular perforated disk, with a diameter somewhat smaller than the inner diameter of the reaction tube, by removing approximately one-third of the disk area moving towards the center of the disk from a point on its circumference. It has been found that, by the use of such an assymetrical agitator element, vibrational energy can be transmitted to the bottom of the powder bed more effectively than would otherwise be the case, while at the same time not impeding the circulation of the powder within the fluidized bed, again in contrast to the method of the '673 patent which employs a symmetrical vibrating disc which, we have found, may act as a baffle, blocking the circulation of the powder within the fluidized bed. It has also been discovered that the effectiveness of such an agitator element can be greatly improved by cycling the driver power supplied to the vibrator. Of particular usefulness is a cycle with an approximate one minute period in which the power to the vibrator is turned off or reduced in intensity for an approximate 10 second interval, on or increased for about 1 second, off or decreased for about 1 second, on or increased for about 1 second, off or decreased for about 1 second, and on or increased for the duration of the period. A microprocessor coupled with suitable interface circuitry and a switching facility may be used to cycle the power to the vibrator.

A schematic representation of the fluidized bed reactor is shown in FIG. 1. In FIG. 1, a feeder line 11 carries the inert carrier through valve 54 gas into a stainless bubbler 12 which contains aluminum isopropoxide. In the bubbler 12, the coating precursor, aluminum isopropoxide, is vaporized into the carrier gas. The bubbler is heated by heating means such as heating tape (not shown). The carrier gas containing the AIP can be diluted to provide appropriate concentration of reactants. Valves 54 and 55 provide means to divert the carrier gas directly to the fluidized reactor tube 15 through connector line 111. The carrier gas containing the vaporized AIP is carried through connector lines 13 and 111, which are heated with heating tape 30, or other heating means. The carrier gas with the AIP passes through a stainless steel plenum 40 which is maintained at a temperature between 150° C. and 180° C. The carrier gas along with the vaporized AIP then flows through a porous stainless steel gas distributor 14 which is also maintained at a temperature between 150° C. and 180° C. In this case, the porous stainless steel gas distributor is cooled by a flow of chilled nitrogen gas circulating through a channel formed around the circumference of the stainless steel ring 31 which supports the gas distributor 14. Two layers of porous non-woven glass fiber paper, 33, each 5 mil thick are positioned over the top surface of the porous gas distributor to insulate it from the hot phosphor powder bed with which it would otherwise have been in contact. The gas then flows into a quartz glass reaction tube 15. Within the reaction tube 15 is a vibrating mixer 17. Circumferentially located on the shaft of the vibrating mixer 17 and near the vibrating disc 19 are a series of holes 18 through which the oxidizing gas with or without an inert diluting gas enters the reaction tube 15. The quartz glass reaction tube is surrounded by a furnace 20.

The fluidized powder bed contained within the quartz tube 15 has a bottom which has been flared out and ground to a flat surface. Circular gaskets cut from pressed graphite paper are positioned between the flat surfaces of the stainless steel ring 31 surrounding and supporting the porous stainless steel gas distributor 14, the flat upper surface of the stainless steel plenum 40 and the flat lower surface of the quartz reactor tube 15. Stainless steel flanges with beveled edges (not shown) are employed to couple the stainless steel plenum, the stainless steel distributor, and the quartz tube 15 via a set of six screws (not shown) each fitted with two washers and a steel spring. The heated stainless steel tube leading from the AIP bubbler is connected to the bottom via a Swagelok fitting (not shown). When the entire assembly is positioned within the furnace 20, the gas distributor is positioned about 6-19 cm below the heated furnace zone. Fiber glass thermal insulation (not shown) is wrapped around the portion of the quartz tube 15 extending below the heated furnace zone. Thermocouples (not shown) are attached to the stainless steel plenum 40, to the stainless steel distributor 14, and to the heated gas lines 13, the indicated temperatures being recorded using a Fluke data logger. Heating tapes 30 driven by variable power transformers are used to control the temperatures of the heated lines and reactor elements. Additional thermocouples (not shown) are positioned within the quartz reactor tube at positions approximately 1 cm, 13 cm, and 27 cm above the surface of the stainless steel distributor 14 in order to monitor the fluidization efficiency as a function of time. The outputs of these thermocouples are also recorded frequently using the Fluke data logger.

Nitrogen gas, passed through a Centorr gas purifier, was employed as the inert carrier gas for the AIP. Pure oxygen gas flowed through the hollow quartz tube 21 suspended from a Model E1 Vibromixer, entering the powder bed at a point about 6 cm above the assymetrical, half-moon shaped perforated quartz vibrating element 19 which was located 2 cm above the surface of the porous stainless steel distributor 14. The output of the power supply to the Vibromixer was cycled as described above. Finally, the coated materials were annealed in air.

EXAMPLE 1

Figure 2:
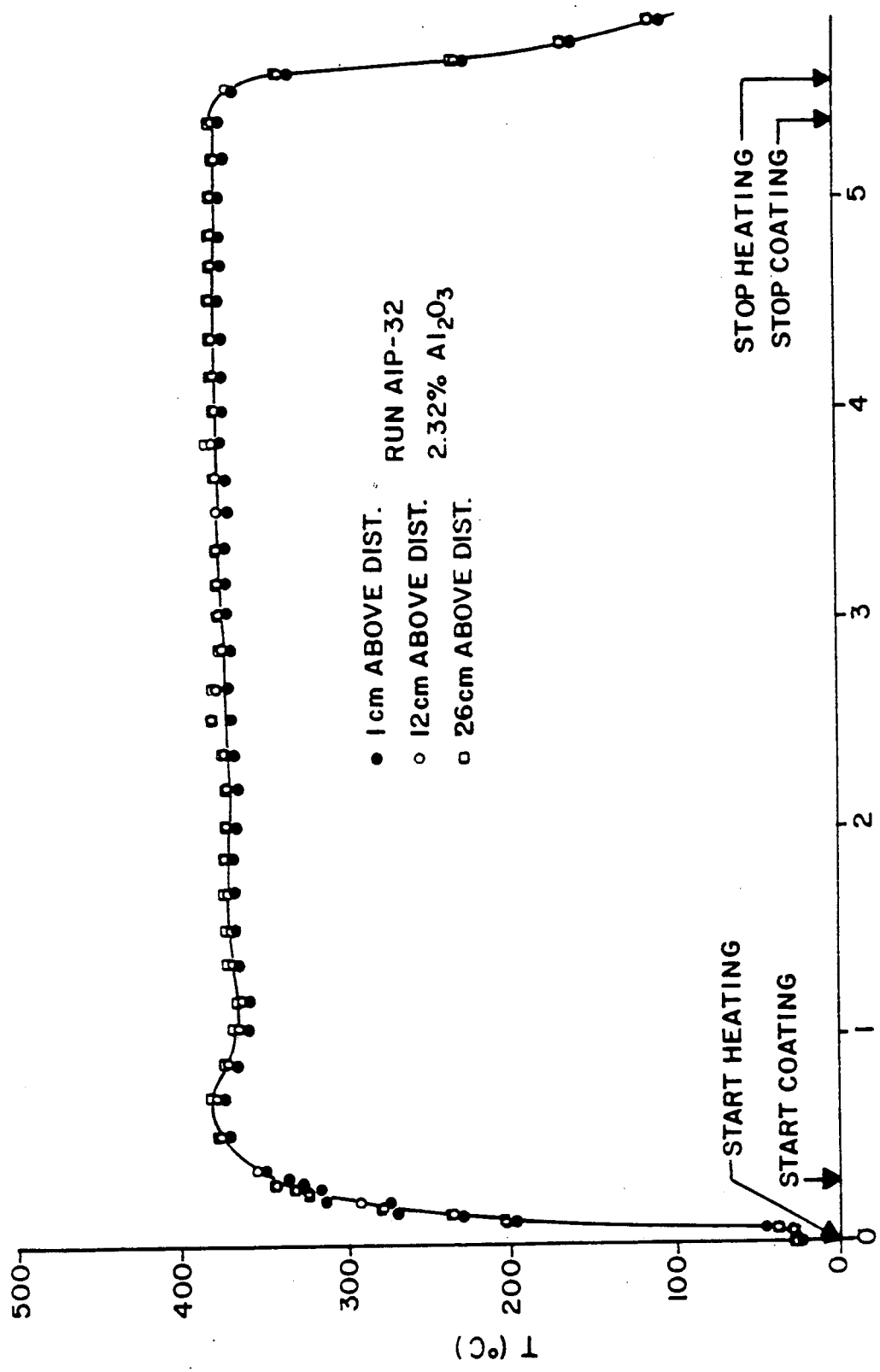
FIG. 2 shows the fluidized bed temperature at various positions in the reactor versus time during the coating process of a zinc silicate phosphor of the present invention.
Figure 3:
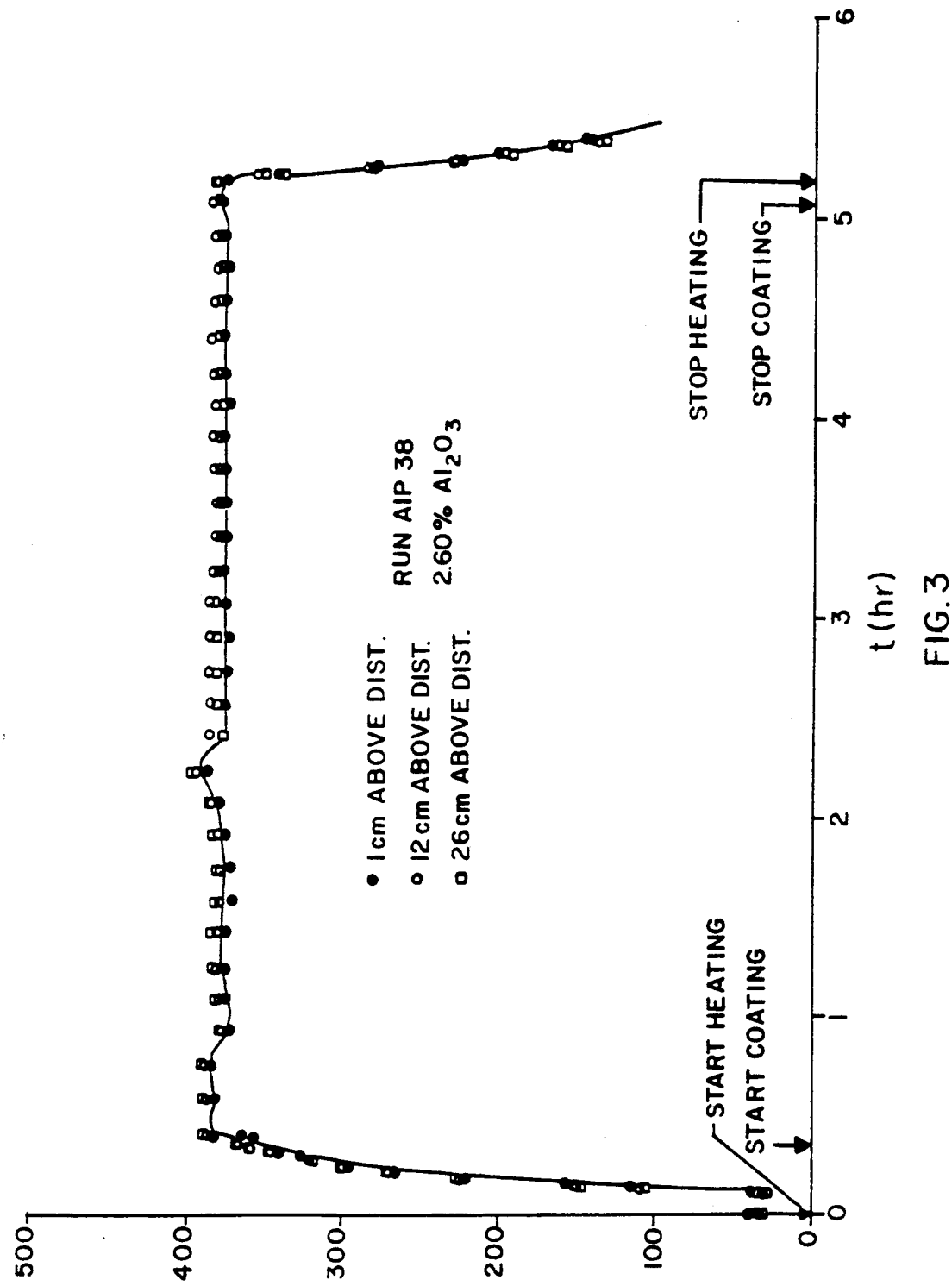
FIG. 3 shows the fluidized bed temperature at various positions in the reactor versus time during the coating process of a cool white phosphor of the present invention.
Figure 4A:
FIG. 4a, 4b, 4c and 4d show SEM images of AIP/$O_2$ coated cool white phosphors.
Figure 4B:
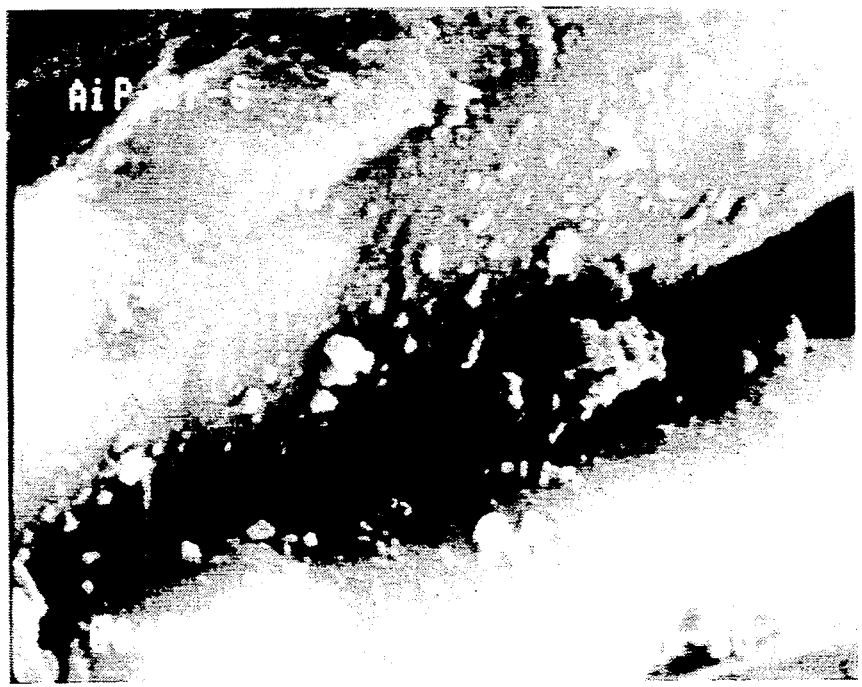
Figure 4C:
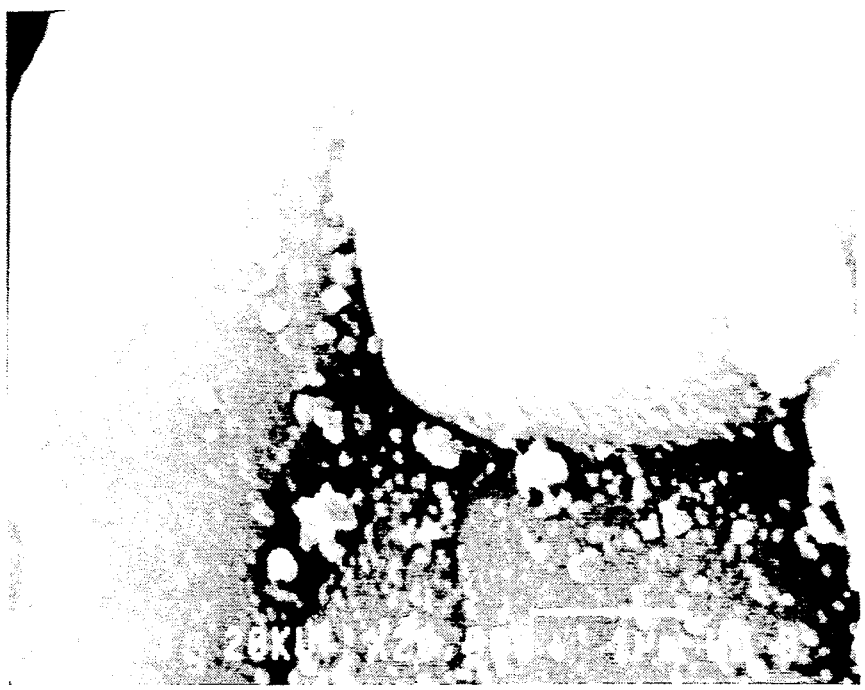
Figure 4D:
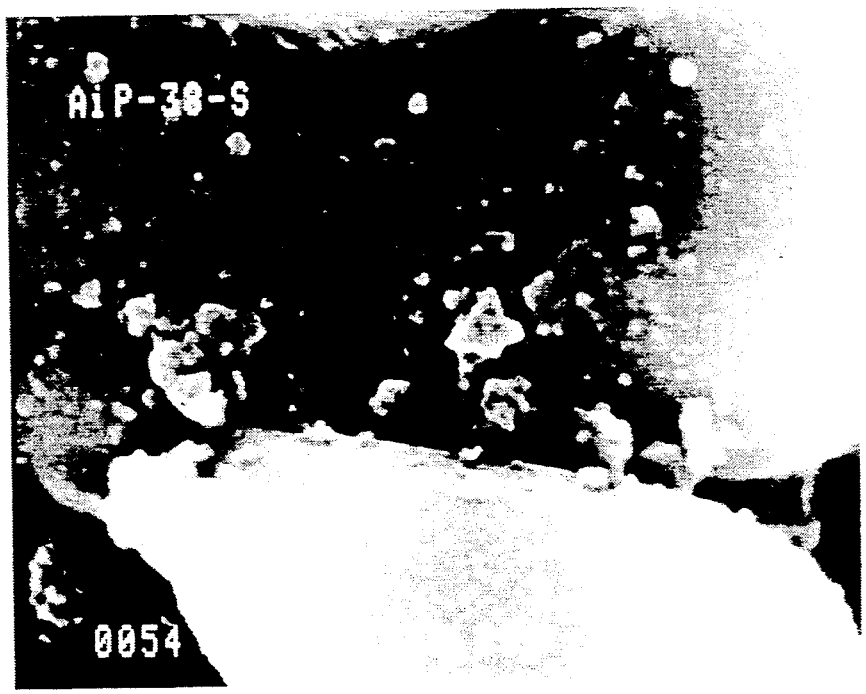
Figure 5A:
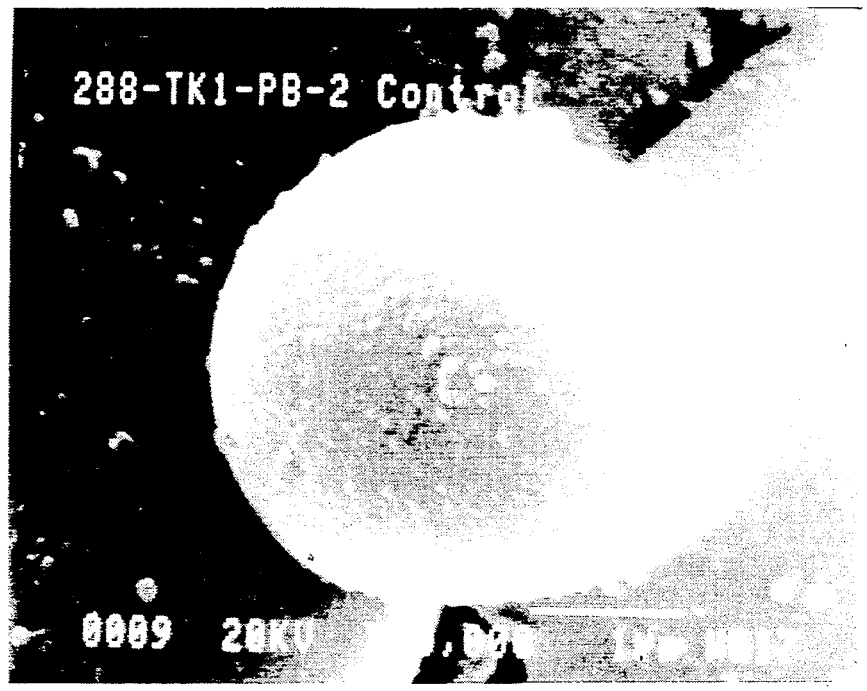
FIG. 5a, 5b, 5c and 5d show SEM images of AIP/$O_2$ coating zinc silicate phosphors.
Figure 5B:
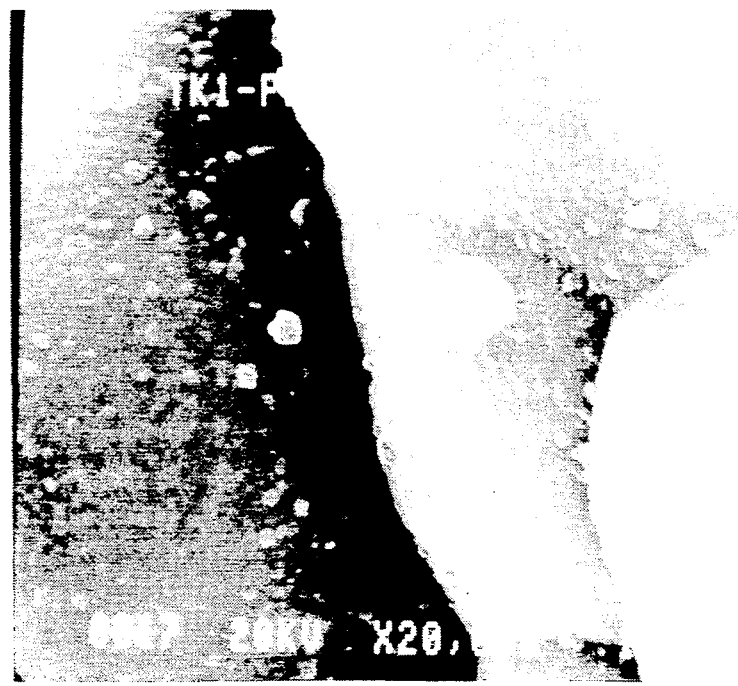
Figure 5C:
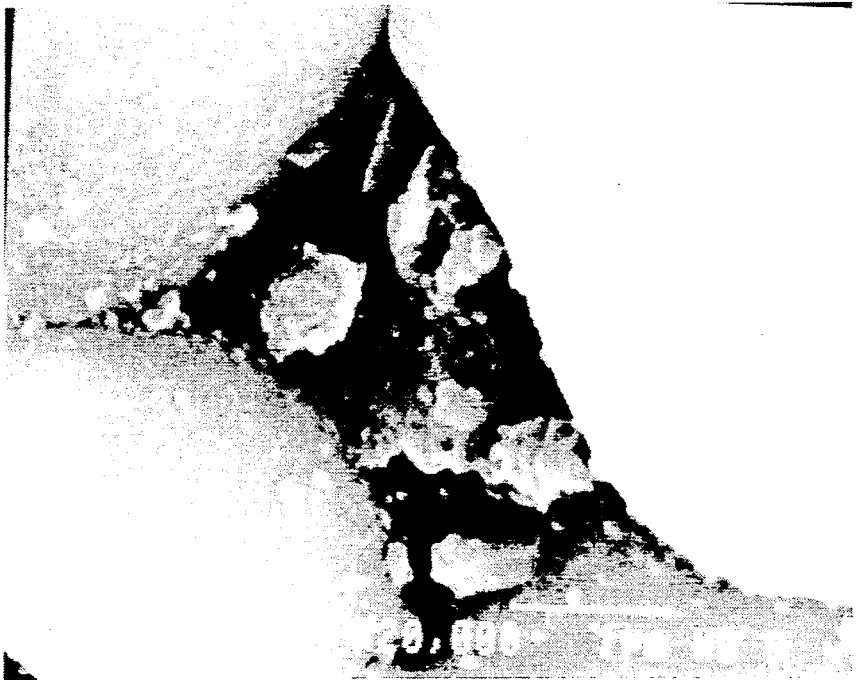
Figure 5D:

Cool white (calcium halophosphate) and $Zn_2SiO_4$:Mn phosphors (containing between 0.1% and 0.2% Aluminum Oxide C as a fluidizing aid) were coated with aluminum oxide following the method and procedures previously described. Typical temperature vs time data measured during the coating of the zinc silicate and cool white phosphors are plotted in FIGS. 2 and 3, respectively. As expected for a well fluidized bed, nearly isothermal conditions were observed throughout the coating reactions. The amount of alumina added to each phosphor during the coating reaction was subsequently determined via inductively coupled plasma atomic emission analysis. By adjusting the duration of the coating process, the zinc silicate phosphor was coated with between 1.05 w/o and 2.26 w/o $Al_2O_3$. Cool white phosphors were similarly coated with between 0.10 w/o and 2.60 w/o $Al_2O_3$.

EXAMPLE 2

The degree to which the coatings produced in Example 1 conformed to the contoured phosphor surfaces was evaluated using SEM images obtained at magnifications of 1000×, 5000×, 20,000×, and 50,000×. In general, the images obtained with the coated materials were nearly indistinguishable from those obtained with the uncoated phosphors. Similarly, the images obtained with the annealed coated materials appeared identical to those obtained with unannealed materials.

Typical 20,000× SEM micrographs of AIP/$O_2$-coated cool white are shown in FIG. 4. From left-to-right and top-to-bottom, the imaged materials contained no $Al_2O_3$, 1.5% $Al_2O_3$, 1.94% $Al_2O_3$, and 2.60% $Al_2O_3$, respectively. The small, agglomerated particles visible in the photographs are the particles of Aluminum Oxide C that were mixed with the phosphor as a fluidizing aid prior to coating. As shown, the morphological features of the underlying phosphor particles and, indeed, of the Aluminum Oxide C particles as well, are not altered detectably by the deposition of an increasingly thick and (as shown below) continuous layer of aluminum oxide.

Typical 20,000 SEM micrographs of the AIP/$O_2$-coated zinc silicate phosphor are shown in FIG. 5. From left-to-right and top-to-bottom, the imaged materials contained no $Al_2O_3$, 1.67%, $Al_2O_3$, 2.12% $Al_2O_3$, and 2.26% $Al_2O_3$, respectively. As with the AIP/$O_2$-coated cool white materials, the morphological features of the coated $Zn_2SiO_4$ materials are nearly identical to those of the uncoated control.

EXAMPLE 3

Continuity of the coatings described in Example 1 was evaluated via XPS surface analysis. The relative peak intensity data obtained with the coated zinc silicate materials are listed in Table 1 as a function of increasing coating thickness. Data are shown for both unannealed and annealed samples. In every case, the peak intensities have been scaled to those corresponding to the Al(2p) electron. Several trends are evident. First and foremost is the fact that no zinc, silicon, or manganese is detected with any of the unannealed materials. On the other hand, aluminum, oxygen, and, of course, carbon are detected in each unannealed material. Thus, insofar as can be detected via XPS analysis, in every case the $Zn_2SiO_4$:Mn phosphor appears to be completely coated with a form of aluminum oxide containing carbon as a significant impurity.

With the annealed materials, however, a different pattern emerges. While aluminum, oxygen, and carbon peaks are present with each material, the presence of zinc is also detected. Further, manganese was also detected in the annealed materials in those instances when the portion of the energy spectrum corresponding to the Mn(2p) electron was scanned. These results, along with the absence of a silicon peak with any of the annealed materials, suggest that the zinc and manganese ions diffuse from the surface of the phosphor into the contacting alumina coating during the anneal. Similar results were obtained with the alumina-coated cool white phosphors.

TABLE 1

| Run # | % $Al_2O_3$ | Annealing Conditions | Coating Temperature (°C.) | Al (2p) | O (1S) | Zn (3p) | Si (2p) | Mn (2p) | C (1S) |
|---|---|---|---|---|---|---|---|---|---|
| AIP-18 | 1.05 | — | 400 | 100 | 121 | nd | nd | — | 15 |
|  | 1.05 | 4 hr/750° C. | 400 | 100 | 150 | 17 | nd | — | 14 |
| AIP-16 | 1.45 | — | 350 | 100 | 133 | nd | nd | — | 47 |
|  | 1.45 | 4 hr/750° C. | 350 | 100 | 140 | 17 | nd | — | 35 |
| AIP-17 | 1.67 | — | 350 | 100 | 125 | nd | nd | — | 31 |
|  | 1.67 | 4 hr/750° C. | 350 | 100 | 139 | 13 | nd | — | 37 |
| AIP-33 | 1.65 | — | 375 | 100 | 141 | nd | nd | nd | 30 |
|  | 1.65 | 4 hr/750° C. | 375 | 100 | 165 | 20 | nd | present | — |
| AIP-26 | 2.14 | — | 375 | 100 | 137 | nd | nd | nd | 22 |
|  | 2.14 | 4 hr/750° C. | 375 | 100 | 145 | 13 | nd | 3 | 30 |
| AIP-32 | 2.12 | — | 375 | 100 | 138 | nd | nd | nd | 23 |

TABLE 1-continued

XPS Relative Intensity Data for AIP/O$_2$-Coated Zinc Silicate

| Run # | % Al$_2$O$_3$ | Annealing Conditions | Coating Temperature (°C.) | Al (2p) | O (1S) | Zn (3p) | Si (2p) | Mn (2p) | C (1S) |
|---|---|---|---|---|---|---|---|---|---|
|        | 2.12 | 4 hr/750° C. | 375 | 100 | 153 | 16  | nd | 3       | 41 |
| AIP-21 | 2.62 | —           | 375 | 100 | 138 | nd  | nd | nd      | 31 |
|        | 2.62 | 4 hr/750° C. | 375 | 100 | 142 | 6   | nd | 2       | 18 |
| AIP-31 | 2.56 | —           | 375 | 100 | 143 | nd  | nd | nd      | 25 |
|        | 2.56 | 4 hr/750° C. | 375 | 100 | 152 | 11  | nd | present | 9  |
| AIP-28 | 4.62 | —           | 350 | 100 | 143 | nd  | nd | nd      | 30 |
|        | 4.62 | 4 hr/750° C. | 350 | 100 | 134 | 3   | nd | 1       | 20 |
| AIP-29 | 5.20 | —           | 350 | 100 | 140 | nd  | nd | nd      | 27 |
|        | 5.20 | 4 hr/750° C. | 350 | 100 | 133 | 3   | nd | 1       | 34 |

EXAMPLE 4

As indicated in Example 3, carbon (originating from the AIP coating precursor) is a significant impurity present in all of the alumina coatings. This surface carbon is particularly detrimental to the performance of the phosphor because it imparts a gray body color to the material due to the absorption of visible light. In general, the absorption of visible light by a fluorescent lamp phosphor must be avoided so as to maximize the light output of the fluorescent lamp. As described here, the AIP/O$_2$ coating procedure was modified so as to produce improved alumina coatings with greatly reduced residual carbon concentrations.

First, a 10 cm section of the reactor tube 15, located just above the gas distributor 14, was cooled using chilled water flowing through a water jacket (not shown) sealed onto the tube wall. By the use of this water jacket, the porous gas distributor could be kept reasonable cool even with the fluidized powder bed heated to temperatures above 400° C. Secondly, the continuous coating process employed in the earlier examples was modified to include alternating coating and carbon reduction segments so as to more thoroughly eliminate partially oxidized hydrocarbon species that may become embedded within the alumina coating. The 'coating' segments of the process, being about 30 minutes in duration, are carried out exactly as in the continuous process described above. The intervening carbon reduction segments, on the other hand, are somewhat different. Here, the nitrogen fluidizing gas flows through a bubbler by-pass via valves 54 and 55. At the same time, the oxygen gas flow rate is increased, this gas being passed through an ambient temperature water bubbler prior to entering the reactor. (The water vapor aids in the maintenance of a well fluidized phosphor powder bed during the oxidation step.) The carbon reduction segments are about 15 minutes in duration. As shown in Table 2 the carbon reduction steps run at a higher temperature than the coating steps. In the Examples the coating temperature ranged from approximately 350° C.–445° C. while the carbon reduction steps ranged from 360°–485° C. The temperature of the fluidized bed during the carbon reduction steps must be sufficient to oxidize unreacted carbon on the coatings. Preferably this temperature is about 300° C. to about 500° C. The process begins with a coating segment and ends with carbon reduction segment. The coated powder is then air-annealed, as before.

Cool white phosphor containing 0.2% Aluminum Oxide C as a fluidization aid was coated with alumina via both the continuous AIP/O$_2$-coating method and the alternating coating and carbon reduction method described in this example. The carbon content of each coated material was determined using a Leco carbon analyzer. The alumina content of each material was likewise determined via ICP analysis.

The two coating strategies (continuous coating vs alternating coating and carbon reduction) are compared in Table 2. The results are divided into three groups according to the weight percent alumina present in the coated material. The last column gives the ratio of residual carbon concentrations obtained with the continuous and alternating coating processes. As shown, the residual carbon concentration resulting from the alternating coating and oxidation process ranges from about 50% of that obtained with the continuous process (for alumina concentrations below the 1% level) to about 10% of the continuous process value (for alumina concentrations in excess of 2%).

Figure 6:
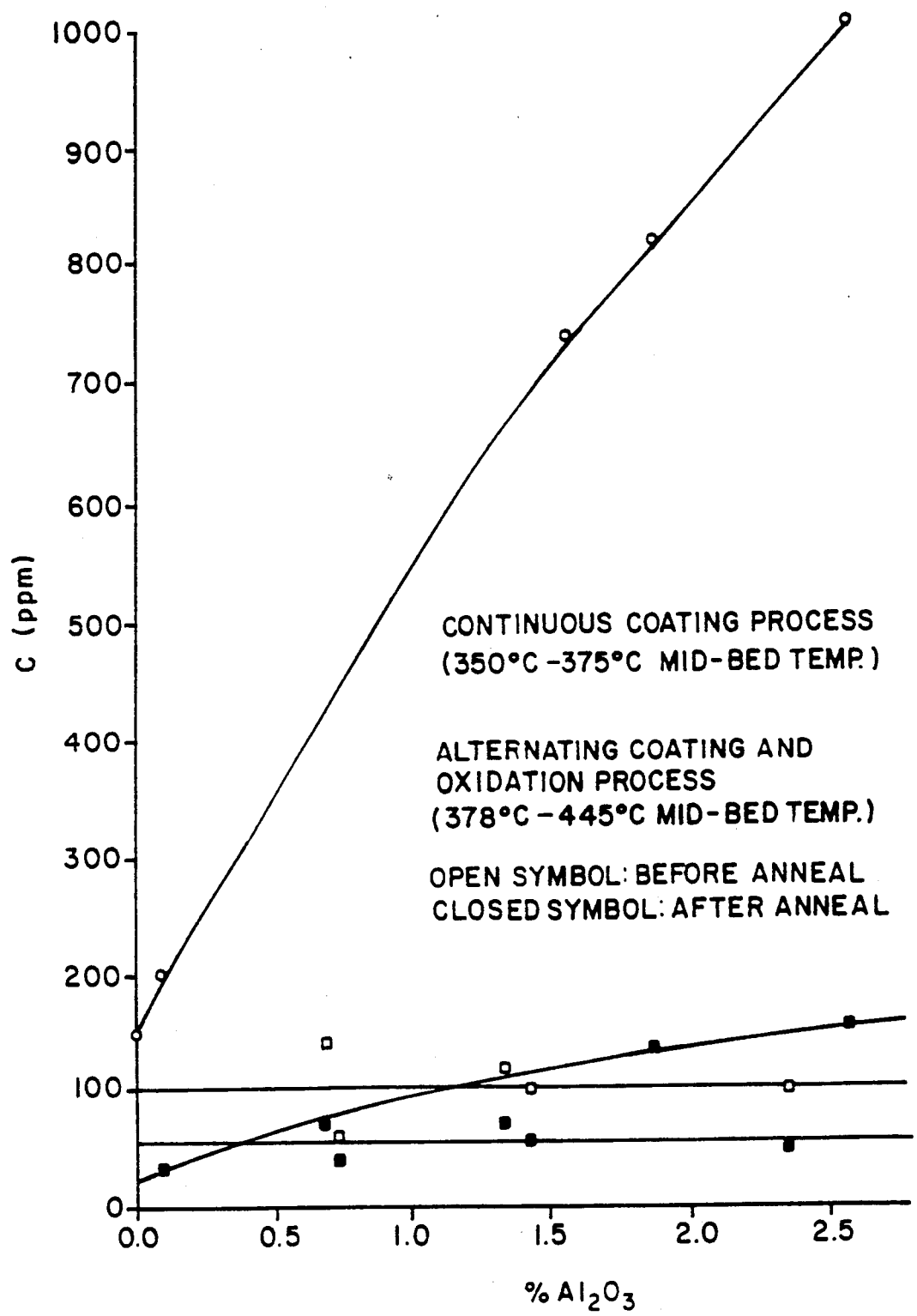
FIG. 6 shows residual carbon concentration versus percent weight alumina for cool white phosphors before and after annealing.

The residual carbon concentration data obtained with the two coating strategies are plotted vs percent alumina in FIG. 6. Also shown are the corresponding data for the coated materials annealed for one hour at 800° C. As shown, the carbon contents of the materials coated via the alternating coating and carbon reduction method and subsequently annealed for one hour at 800° C. are virtually independent of alumina content, the mean carbon concentration being only about 55 ppm. The low residual carbon concentration and its virtual independence of alumina content suggest that the measured carbon level is primarily indicative of that contained within the underlying cool white phosphor, rather than within the alumina coating.

EXAMPLE 5

Figure 7:
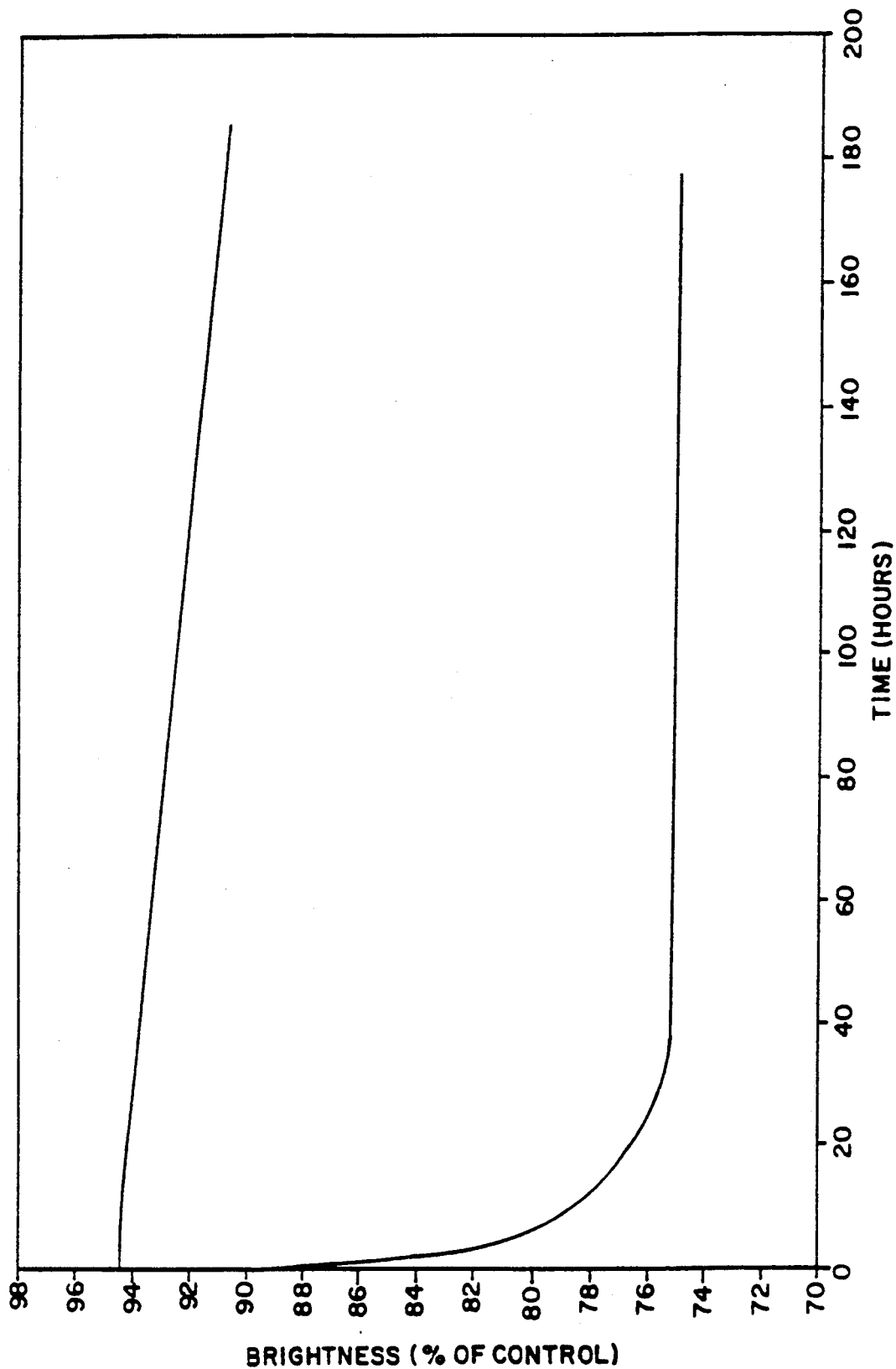
FIG. 7 shows lamp test data for uncoated phosphors and coated phosphors using the method of the present invention.

Fluorescent lamps were fabricated and tested which contained an uncoated Zn$_2$SiO$_4$:Mn phosphor, the same phosphor coated with alumina following the procedures, outlined in Example 4, and, for purposes of comparison, (Ce, Tb) MgAl$_{11}$O$_{19}$:CeTb, a high-brightness, high-maintenance phosphor often used as the green component in a tricolor fluorescent lamp. Plotted in FIG. 7 are the lamp brightness vs time data obtained with the uncoated and alumina-coated Zn$_2$SiO$_4$:Mn phosphor, expressed as a percentage of the brightness measured with the magnesium aluminate control phosphor. Not surprisingly, the uncoated Zn$_2$SiO$_4$:Mn phosphor exhibited very poor fluorescent lamp maintenance relative to the standard tricolor lamp phosphor. In contrast, however, the maintenance of the AIP/O$_2$-coated phosphor was comparable to that of the expensive (Ce,Tb)MgAl$_{11}$O$_{19}$:Ce:Tb control.

TABLE 2

Effect of Coating Process (Continuous or Alternating Coating and Oxidation) Upon Residual Content of AIP/O$_2$ Cool White Phosphor

| Run # | Coating Process | Coating Temperature | Carbon Reduction Temperature | % Al$_2$O$_3$ Coating | [C] (ppm) | [C]$_{avg.}$(ppm) | [C]$_{Continuous}$ [C]$_{Alternating}$ |
|---|---|---|---|---|---|---|---|
| | | | | % Al$_2$O$_3$ Below 1% | | | |
| AIP-14 | Continuous | 350° C. | N/A | 0.10 | 210 | 210 | 2.1 |
| AIP-44 | Alternating | 350° C. | 360° C. | 0.69 | 140 | 100 | |
| AIP-47 | Alternating | 445° C. | 485° C. | 0.74 | 60 | | |
| | | | | % Al$_2$O$_3$ Between 1% and 2% | | | |
| AIP-37 | Continuous | 350° C. | N/A | 1.57 | 740,580 | 695 | 6.3 |
| AIP-15 | Continuous | 350° C. | N/A | 1.88 | 820 | | |
| AIP-36 | Continuous | 395° C. | N/A | 1.94 | 640 | | |
| AIP-45 | Alternating | 410° C. | 440° C. | 1.34 | 120 | 110 | |
| AIP-46 | Alternating | 380° C. | 420° C. | 1.43 | 100 | | |
| | | | | % Al$_2$O$_3$ Above 2% | | | |
| AIP-10 | Continuous | 350° C. | N/A | 2.57 | 1000 | 885 | 8.8 |
| AIP-38 | Continuous | 385° C. | N/A | 2.60 | 770 | | |
| AIP-43 | Alternating | 375° C. | 410° C. | 2.36 | 100 | 100 | |

EXAMPLE 6

Additional fluorescent lamps were fabricated using a Zn$_2$SiO$_4$:Mn phosphor coated with alumina using the method described above (employing AIP as the coating precursor) and coated with alumina according to the method of Sigai (U.S. Pat. No. 4,585,673, employing TMA as the coating precursor). The results of these 40 W T-12 lamp tests are compared in Table 3. Listed are the measured lumen outputs and (in parentheses) the lamp maintenance, expressed as percent of the corresponding 0 hour brightness. As indicated in the table, the brightness and maintenance performance data obtained with the AIP/O$_2$-coated phosphor (prepared according to the method of this disclosure) are comparable to those obtained with the TMA/O$_2$-coated phosphor (prepared according to the prior art, using the pyrophoric and much more expensive alkyl aluminum coating precursor).

TABLE 3

40W T-12 Fluorescent Lamp Performance Summary

| Al$_2$O$_3$ Precursor | Phosphor Luminance (Maintenance) | | |
|---|---|---|---|
| | 0 Hours | 100 Hours | 500 Hours |
| AIP | 4347 | 4156 (95.6) | 3990 (91.8) |
| TMA | 4285 | 4132 (96.4) | 3916 (91.4) |

EXAMPLE 7

Additional fluorescent lamps were fabricated using a Zn$_2$SiO$_4$:Mn phosphor coated with alumina following the method outlined above (with AIP as the coating precursor). Similar lamps were made with (Ce, Tb) MgAl$_{11}$O$_{19}$:Ce:Tb, the standard tricolor lamp green phosphor, in place of the AIP/O$_2$-coated Zn$_2$SiO$_4$:Mn. The results of these 20 W T-12 lamp tests are compared in Table 4. Listed are the measured lumen outputs and (in parentheses) the lamp maintenance, expressed as percent of the corresponding 0 hour brightness. As indicated in the table, the performance data obtained with the AIP/O$_2$-coated Zn$_2$SiO$_4$:Mn phosphor are comparable to those obtained with the rare-earth-containing green phosphor.

TABLE 4

20W T-12 Fluorescent Lamp Performance Summary

| Phosphor | Phosphor Luminance (Maintenance) | | |
|---|---|---|---|
| | 0 Hours | 100 Hours | 500 Hours |
| (Ce,Tb)MgAl$_{11}$O$_{19}$:Ce:Tb | 2003 | 1950 (97.4) | 1914 (95.6) |
| AIP/O$_2$-Coated Zn$_2$SiO$_4$:Mn | 1869 | 1810 (96.8) | 1747 (93.5) |

While the method for coating phosphor particles here disclosed has so far been applied only to coating formed using AIP as the coating precursor, we believe that it could be applied with equal success with a variety of other organometallic precursors. Among these, of course, are the host of other aluminum alkoxy compounds and other metal alkoxy compounds that resemble AIP with respect to their physical and chemical characteristics. However, we believe that this method can also be applied very successfully with aluminum alkyls and other metal alkyls, as well. For instance, we believe that the method described in this disclosure could be used very effectively with TMA as the coating precursor. By overcoming the coating precursor decomposition and phosphor particle agglomeration problems inherent in the use of AIP as an organometallic precursor, we have arrived at a method for coating phosphor particles that is considerably more powerful than described in the '673 patent since it can be used effectively with a much wider range of coating precursors. In addition, it does not require that the fluidized powder bed be maintained in a relatively large temperature gradient. However, the process of the present invention does require that a coating step followed by an carbon reduction step to produce a coating with a low carbon concentration.

While there has been shown and described what at present are considered preferred embodiment to the invention, it will be obvious to those skilled in the art the various changes and modifications may be made therein without departing from the scope of the invention as defined by the appended claims.

What is claimed is:

1. A method for forming a continuous coating on phosphor particles of a fine phosphor powder comprising:

a) vaporizing aluminum isopropoxide into an inert carrier gas at a temperature below the decomposition temperature of aluminum isopropoxide to form a carrier gas containing vaporized aluminum isopropoxide;

b) passing said carrier gas containing aluminum isopropoxide through a mixture of fine phosphor powder and up to 1 weight percent of a fluidizing aid in which the particles are suspended in the carrier gas and to envelop the fluidized particles with vapor of aluminum isopropoxide, said fluidized bed being maintained at a nearly isothermal condition and at a temperature above 300° C.;

c) passing an oxidizing gas into said fluidized bed and reacting said oxidizing gas with the vaporized aluminum isopropoxide on the phosphor powder for a period of time sufficient to form a continuous coating of predetermined thickness on the phosphor particles; and d) shutting off the flow of said carrier gas containing vaporized aluminum isopropoxide to said fluidized bed to oxidize any unreacted carbon on the continuous coating of predetermined thickness on the phosphor particles at a temperature of about 300° C. to about 500° C. so that the residual carbon content on the coating is reduced.

2. The method according to claim 1 wherein said inert carrier gas is selected from the group consisting of nitrogen, argon, helium, neon and mixtures thereof.

3. The method according to claim 1 wherein said oxidizing gas is diluted with an inert gas.

4. The method according to claim 1 further comprising:

e) annealing the phosphor particles having a continuous coating of predetermined thickness in air at a temperature of approximately 750° C.

5. A method for forming a continuous alumina coating on phosphor particles of a fine phosphor powder comprising:

a) vaporizing aluminum isopropoxide into an inert carrier gas at a temperature below the decomposition temperature of the coating precursor material to form a carrier gas containing vaporized aluminum isopropoxide;

b) passing said carrier gas containing vaporized aluminum isopropoxide through a mixture of fine phosphor powder in which the particles are suspended in the carrier gas and to envelop the fluidized particles with a vapor of coating precursor material, said fluidized bed being maintained at a nearly isothermal condition and at a temperature above 300° C.;

c) passing an oxidizing gas into said fluidized bed and reacting said oxidizing gas with the vaporized aluminum isopropoxide on the phosphor powder for a period of time sufficient to form a continuous coating of predetermined thickness on the phosphor particles;

d) shutting off the flow of said carrier gas containing vaporized aluminum isopropoxide through the fluidized bed for a period of time sufficient to remove any unreacted hydrocarbons from the continuous coating of predetermined thickness thereby reducing the residual carbon content of the continuous coating, said fluidized bed being maintained at a temperature of about 300° C. to about 500° C.; and e) repeating steps b-d if necessary, in order to increase the thickness of the continuous coating.

6. The process according to claim 5 further comprising:

f) annealing the phosphor powder obtained from step (e) in air at a temperature of approximately 750° C.

7. The method according to claim 5 wherein the inert carrier gas is selected from the group consisting of nitrogen argon, helium, neon and mixtures thereof.

* * * * *